(12) United States Patent
Kim

(10) Patent No.: US 8,913,222 B2
(45) Date of Patent: Dec. 16, 2014

(54) LIQUID CRYSTAL DISPLAY DEVICE

(75) Inventor: Dong-gyu Kim, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 82 days.

(21) Appl. No.: 13/240,863

(22) Filed: Sep. 22, 2011

(65) Prior Publication Data

US 2012/0099057 A1    Apr. 26, 2012

(30) Foreign Application Priority Data

Oct. 25, 2010 (KR) .......................... 10-2010-0104182

(51) Int. Cl.
*G02F 1/1345* (2006.01)
*G02F 1/1339* (2006.01)

(52) U.S. Cl.
CPC .......... *G02F 1/1339* (2013.01); *G02F 1/13452* (2013.01)
USPC ............................ 349/149; 349/153; 349/152

(58) Field of Classification Search
USPC .................... 349/149–152, 153, 157
See application file for complete search history.

(56) References Cited

U.S. PATENT DOCUMENTS

| | | | |
|---|---|---|---|
| 6,392,735 B1 * | 5/2002 | Tani | 349/156 |
| 6,476,901 B2 * | 11/2002 | Fujioka et al. | 349/149 |
| 8,068,205 B2 * | 11/2011 | Ahn | 349/152 |
| 8,208,107 B2 * | 6/2012 | Hayashi | 349/138 |
| 8,334,962 B2 * | 12/2012 | Chang et al. | 349/152 |
| 2003/0058388 A1 * | 3/2003 | Nakayoshi et al. | 349/113 |
| 2007/0109455 A1 | 5/2007 | Kim et al. | |
| 2009/0141223 A1 * | 6/2009 | Hayashi | 349/114 |
| 2009/0174856 A1 * | 7/2009 | Aoki | 349/153 |

FOREIGN PATENT DOCUMENTS

| | | | |
|---|---|---|---|
| KR | 10-2004-0045201 A | 6/2004 | |
| KR | 10-2005-0113906 A | 12/2005 | |
| KR | 10-2007-0050612 A | 5/2007 | |
| KR | 10-2007-0069410 A | 7/2007 | |

* cited by examiner

*Primary Examiner* — Richard Kim
*Assistant Examiner* — Kendrick Hsu
(74) *Attorney, Agent, or Firm* — Knobbe, Martens, Olson & Bear, LLP

(57) ABSTRACT

A liquid crystal display (LCD) device is disclosed. In one embodiment, the LCD device includes a first substrate including a plurality of interconnections and a protection layer covering the interconnections, a second substrate disposed opposite the first substrate, a liquid crystal (LC) layer interposed between the first and second substrates, and a sealant configured to contact the protection layer and interposed between the first and second substrates to surround and seal the LC layer. Convex portions are formed at positions between the interconnections of the protection layer and protrude convexly toward the sealant. In the above-described structure, even if light irradiated to cure the sealant is blocked by the plurality of interconnections, the light can be diffused into the entire sealant at an interface between the sealant and the protection layer.

20 Claims, 2 Drawing Sheets

LIQUID CRYSTAL DISPLAY DEVICE

CROSS-REFERENCE TO RELATED PATENT APPLICATION

This application claims the benefit of Korean Patent Application No. 10-2010-0104182, filed on Oct. 25, 2010, in the Korean Intellectual Property Office, the disclosure of which is incorporated herein in its entirety by reference.

BACKGROUND

1. Field

The described technology generally relates to a liquid crystal display (LCD) device, and more particularly, to an LCD device in which a region where a sealant overlaps interconnections is structurally improved.

2. Description of the Related Technology

In general, a liquid crystal display (LCD) device includes i) a first substrate including a thin-film transistor (TFT) configured to drive each pixel region, ii) a second substrate disposed opposite the first substrate and having a color filter (CF) for realizing color, and iii) a liquid crystal (LC) layer interposed between the first and second substrates. Thus, when an appropriate voltage is applied between the first and second substrates by driving the TFT, the arrangement of LC molecules of the LC layer may be varied to control the transmittance of light emitted by a backlight unit (BLU). As a result, the amount of light passing through the CF is controlled, thus displaying an image having a desired color.

In addition, a sealant configured to seal and protect the LC layer may be interposed between the first and second substrates. The sealant may be coated between the first and second substrates and cured by UV irradiation, thereby forming a solid sealing structure.

Here, a plurality of interconnections configured to transmit electric signals may be disposed at regions of the sealant disposed on the first substrate. Accordingly, the corresponding regions of the sealant covered with the interconnections may be less cured during the UV irradiation for curing the sealant. Furthermore, since the number of interconnections has a tendency to increase the resolution of LCDs, spaces between interconnections, through which the sealant is irradiated with UV light, are gradually decreasing. Therefore, the area of uncured regions that is not irradiated with UV light may increase, and impurities may be discharged from the uncured regions to cause screen spots.

SUMMARY

One inventive aspect is a liquid crystal display (LCD) device that is structurally improved to inhibit the non-curing of a sealant in a region where the sealant overlaps interconnections.

Another aspect is an LCD device including: a first substrate including a plurality of interconnections and a protection layer covering the interconnections; a second substrate disposed opposite the first substrate; a liquid crystal (LC) layer interposed between the first and second substrates; and a sealant configured to contact the protection layer and interposed between the first and second substrates to surround and seal the LC layer. Convex portions are formed at positions between the interconnections of the protection layer and protrude convexly toward the sealant.

Concave portions may be formed at regions contacting the convex portions of the sealant and engaged with the convex portions of the sealant.

The concave portions may have a concave-lens effect so that external light can be irradiated and diffused into the sealant.

A thin-film transistor (TFT) may be disposed on the first substrate. A color filter may be disposed on the second substrate. The protection layer may include an organic layer.

Another aspect is an LCD which includes: a first substrate; a second substrate disposed opposite the first substrate; a liquid crystal (LC) layer interposed between the first and second substrates; a sealant interposed between the first and second substrates to surround and seal the LC layer; interconnections installed on any one of the first and second substrates in a region overlapping the sealant; and a protection layer configured to cover the interconnections and having convex portions protruding convexly toward the sealant.

Concave portions may be formed at regions contacting the convex portions of the sealant and engaged with the convex portions of the sealant.

The concave portions may have a concave-lens effect so that external light can be irradiated and diffused into the sealant.

A TFT may be disposed on the first substrate. A color filter may be disposed on the second substrate. The protection layer may include an organic layer.

DETAILED DESCRIPTION

Figure 1:
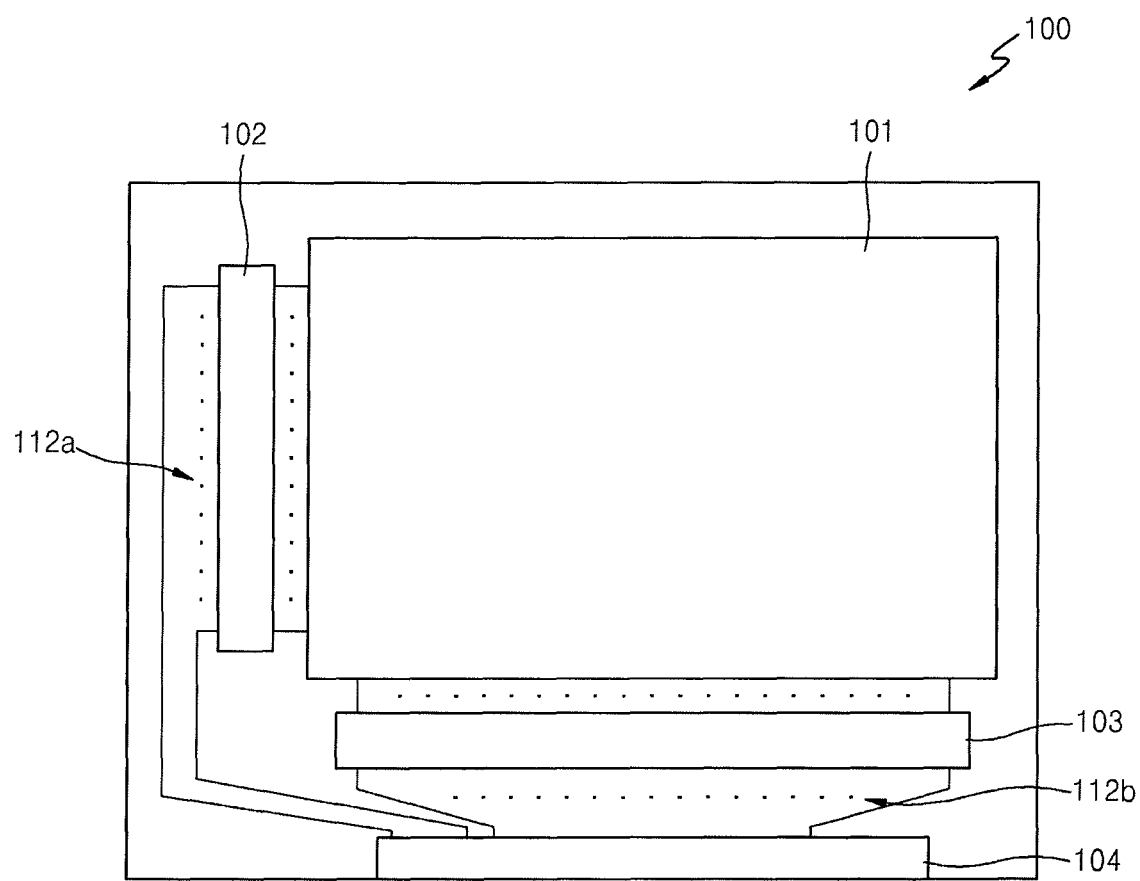
FIG. 1 is a plan view of a liquid crystal display (LCD) device according to an embodiment.

Embodiments will be described with reference to the accompanying drawings. FIG. 1 is a plan view of a liquid crystal display (LCD) device 100 according to an embodiment.

Referring to FIG. 1, the LCD device 100 may include a display unit 101 serving as an effective emission region, a scan driver 102 configured to apply a scan signal to the display unit 101, and a data driver 103 configured to apply a data signal to the display unit 101. The scan driver 102 and the data driver 103 may be disposed outside the display unit 101.

In addition, a pad unit 104 may be disposed outside the display unit 101. The scan driver 102 may be electrically connected to the pad unit 104 by first interconnections 112a, whereas the data driver 103 may be electrically connected to the pad unit 104 by second interconnections 112b. Although FIG. 1 illustrates only the scan driver 102 and the data driver 103, the LCD device 100 may further include a timing controller (not shown) configured to control the scan driver 102 and the data driver 103 and a common voltage generator (not shown) configured to apply a common voltage Vcom serving as a reference voltage to the display unit 101. Each of the timing controller and the common voltage generator may be connected to the pad unit 104 by common voltage interconnections 112c (see FIG. 2).

Figure 2:
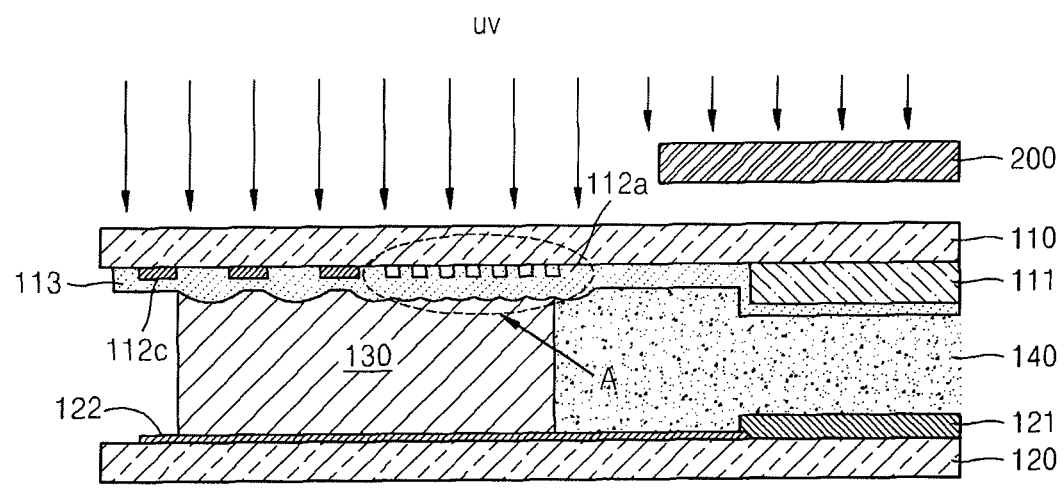
FIG. 2 is a cross-sectional view of a main portion of the LCD device of FIG. 1.

In the LCD device 100 having the above-described structure, non-pixel regions other than the display unit 101 serving as the effective emission region may be covered with a black matrix (refer to 122 in FIG. 2). The black matrix 122 may prevent an image from leaking from the display unit 101 to the remaining regions except the display unit 101 and prevent interconnections from being exposed outside.

FIG. 2 is a cross-sectional view of a portion through which the first interconnections 112a pass in the LCD device 100 of FIG. 1. An example of the LCD device 100 of FIG. 2 includes the common voltage interconnections 112c.

Referring to FIG. 2, the LCD device 100 may include a first substrate 110 having a thin-film transistor (TFT) 111 thereon, a second substrate 120 disposed opposite the first substrate 110 and having a color filter (CF) 121 used for embodying color thereon, and a liquid crystal (LC) layer 140 interposed between the first and second substrates 110 and 120. Thus, when an appropriate voltage is applied between the first and second substrates 110 and 120 by driving the TFT 111, the arrangement of LC molecules of the LC layer 140 may be changed to control the transmittance of light of a backlight unit (not shown). Thus, the amount of light passing through the CF 121 may be controlled to embody an image in a desired color. Accordingly, a region where the image is directly embodied may correspond to the display unit 101 of FIG. 1.

In addition, a sealant 130 may be interposed between the first and second substrates 110 and 120 and seal and protect the LC layer 140. The sealant 130 may be coated between the first and second substrates 110 and 120, cured by ultraviolet (UV) radiation, and form a solid sealing structure. A mask 200 may cover a pixel region including the TFT 111 and the color filter 121 during the UV irradiation for curing the sealant 130. The black matrix 122 may cover a non-pixel region as described above, and an organic layer 113 may be a protection layer configured to protect the interconnections 112a and 112c and the TFT 111. Here, the interconnections 112a and 112c may partially overlap the sealant 130 in order to minimize a region to be covered with the black matrix 122. By minimizing the region to be covered with the black matrix 122, the non-pixel region may be reduced to facilitate the manufacture of a large screen.

Figure 3:
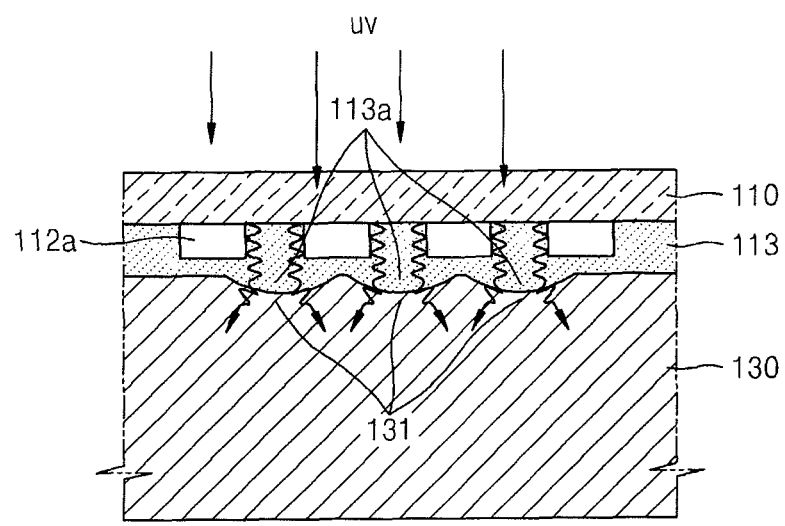
FIG. 3 is an enlarged cross-sectional view of a portion A of FIG. 2.

Referring to FIG. 3, which is an enlarged view of a portion A of FIG. 2, the organic layer 113 may have an embossed structure having convexly protruding convex portions 113a instead of a planar structure.

Specifically, the convex portions 113a may be formed by convexly protruding regions between the interconnections 112a and 112c of the organic layer 113 toward the sealant 130. The embossed structure of the organic layer 113 may be easily obtained by performing a graded exposure process using a mask according to regions.

When the organic layer 113 has the embossed structure, concave portions 131 may be formed at regions of the sealant 130, which contact the organic layer 113, and engaged with the convex portions 113a. Specifically, since a flowable sealant 130 is coated along the shape of the organic layer 113 before a curing process, the concave portions 131 may be formed to be engaged with the convex portions 113a.

The concave portions 131 may function as concave lenses so that UV light can be reliably irradiated into even regions covered with the interconnections 112a and 112c during a UV exposure process for curing the sealant 130.

Specifically, as shown in FIG. 3, UV light may be refracted through an interface between the organic layer 113 and the sealant 130. In this case, the concave portions 131 may function as concave lenses so that UV light can be refracted at a large angle and diffused around.

Accordingly, since the UV is reliably irradiated into even the regions covered with the interconnections 112a and 112c, the entire sealant 130 may be substantially uniformly cured. As a result, an uncured region may be substantially removed.

The LCD display device according to the above-described structure may be fabricated as follows.

To begin with, a first substrate 110 including a TFT 111 and interconnections 112a and 112c and a second substrate 120 including a CF 121 may be prepared. An organic layer 113 having convex portions 113a may be formed to cover the TFT 111 and the interconnections 112a and 112c of the first substrate 110. In this case, the convex portions 113a of the organic layer 113 may be formed using a mask at regions between the interconnections 112a and 112c.

Subsequently, the first and second substrates 110 and 120 may be bonded with each other by interposing the sealant 130 therebetween. In this case, concave portions 131 may be formed at regions of the sealant 130, which contact the organic layer 130 and engaged with the convex portions 113a.

Thereafter, the sealant 130 may be cured by UV irradiation. Thus, UV light may be refracted at the concave portions 131 and reliably irradiated into regions covered with the interconnections 112a and 112c so that the entire sealant 130 can be substantially uniformly cured.

Afterwards, an LC layer 140 may be formed in an airtight space surrounded by the sealant 130.

To sum up, the above-described LCD device may have the following effects.

To begin with, since the uncured region of the sealant 130 is substantially removed as described above, screen spots caused by discharge of impurities from the uncured region may be prevented. In other words, the concave portions 131 serving as concave lenses may refract UV light so that the UV light can be sufficiently irradiated into even regions covered with the interconnections 112 during the curing of the sealant 130, thereby solving problems caused by the remaining uncured region.

In addition, cohesion of the sealant 130 with the first substrate 110 may be improved. Specifically, since a contact area between the organic layer 113 and the sealant 130 is increased due to the organic layer 113 having an embossed shape, the cohesion of the sealant 130 with the first substrate 110 may be increased as much, thereby further enhancing sealing effects of the sealant 130.

Furthermore, UV light is sufficiently irradiated over the entire area in spite of a small interval between the interconnections 112, thereby facilitating fabrication of a high-resolution LCD with a particularly small interval between the interconnections 112 or a slim-black-matrix-type LCD with a reduced width of the black matrix 122 covering the non-pixel region.

Also, the above-described embodiments mainly describe the structure of the first interconnection 112a, but the above embodiments may be applied likewise to the second interconnection 112b shown in FIG. 1.

According to at least one of the disclosed embodiments, even if light irradiated to cure the sealant is blocked by the interconnections, the light can be diffused into the entire sealant, thereby inhibiting the formation of an uncured region.

While certain embodiments have been described with reference to the accompanying drawings, it will be understood by those of ordinary skill in the art that various changes in form and details may be made therein without departing from the spirit and scope of the following claims.

What is claimed is:

1. A liquid crystal display (LCD) device comprising:
  a first substrate, wherein a plurality of interconnections are formed on the first substrate;
  a protection layer covering the interconnections;
  a second substrate formed to oppose the first substrate;
  a liquid crystal (LC) layer interposed between the first and second substrates; and a sealant configured to contact the protection layer and interposed between the first and second substrates so as to surround and substantially seal the LC layer, wherein the protection layer comprises i) three or more convex portions and ii) three or more concave portions respectively directly facing the interconnections and alternatively formed with respect to the convex portions, wherein each of the convex portions protrudes convexly toward the sealant, wherein the size of each of the convex portions is greater than the size of each of the neighboring concave portions, and wherein the convex portions are evenly spaced apart.

2. The LCD device of claim 1, wherein the sealant comprises a plurality of convex portions, and wherein the concave portions of the protection layer are formed so as to contact the convex portions of the sealant and engaged with the convex portions of the sealant.

3. The LCD device of claim 2, wherein the concave portions are configured to guide external light to diffuse into the sealant.

4. The LCD device of claim 1, further comprising a thin-film transistor (TFT) formed on the first substrate.

5. The LCD device of claim 1, further comprising a color filter formed on the second substrate.

6. The LCD device of claim 1, wherein the protection layer comprises an organic layer.

7. The LCD device of claim 1, wherein the protection layer comprises a plurality of concave portions alternatively formed with respect to the convex portions thereof.

8. The LCD device of claim 7, wherein the concave portions of the protection layer are formed directly below the interconnections.

9. The LCD device of claim 1, wherein the concave portions are evenly spaced apart.

10. The LCD device of claim 1, wherein each of the convex and concave portions is curved.

11. A liquid crystal display (LCD) device comprising:
a first substrate;
a second substrate opposing the first substrate;
a liquid crystal (LC) layer interposed between the first and second substrates;
a sealant interposed between the first and second substrates to surround and substantially seal the LC layer;
interconnections formed on at least one of the first and second substrates so as to at least partially overlap with the sealant; and
a protection layer configured to substantially cover the interconnections and having i) three or more convex portions and ii) three or more concave portions respectively directly facing the interconnections and alternatively formed with respect to the convex portions, wherein each of the convex portions protrudes convexly toward the sealant, wherein the size of each of the convex portions is greater than the size of each of the neighboring concave portions, and wherein the convex portions are evenly spaced apart.

12. The device of claim 11, wherein the sealant comprises a plurality of convex portions, and wherein the concave portions of the protection layer are formed so as to contact the convex portions of the sealant and engaged with the convex portions of the sealant.

13. The device of claim 12, wherein the concave portions are configured to guide external light to diffuse into the sealant.

14. The device of claim 11, further comprising a thin-film transistor (TFT) formed on the first substrate.

15. The device of claim 11, further comprising a color filter formed on the second substrate.

16. The device of claim 11, wherein the protection layer includes an organic layer.

17. The device of claim 11, wherein the protection layer comprises a plurality of concave portions alternatively formed with respect to the convex portions thereof.

18. The device of claim 17, wherein the concave portions of the protection layer are formed directly below the interconnections.

19. The device of claim 11, wherein the concave portions are evenly spaced apart.

20. The device of claim 11, wherein each of the convex and concave portions is curved.

* * * * *